United States Patent [19]

Foladare et al.

[11] Patent Number: 5,894,595
[45] Date of Patent: Apr. 13, 1999

[54] PERSONAL MOBILE COMMUNICATION SYSTEM

[75] Inventors: Mark Jeffrey Foladare, Kendall Park; Albert Friedes; Shelley B. Goldman, both of East Brunswick; Susanne Watson Moroses, Monmouth Beach; Nancy Murray, Morris Township; David Phillip Silverman, Somerville; Roy Philip Weber, Bridgewater, all of N.J.

[73] Assignee: AT&T Corp, Middletown, N.J.

[21] Appl. No.: 08/803,892

[22] Filed: Feb. 21, 1997

Related U.S. Application Data

[63] Continuation of application No. 08/282,697, Aug. 1, 1994, abandoned.

[51] Int. Cl.$^6$ ............................................. H04Q 7/20
[52] U.S. Cl. ........................ 455/414; 455/459; 455/567; 455/556
[58] Field of Search ...................... 455/31.2, 31.3, 455/414, 415, 417, 445, 458, 459, 460, 556, 567

[56] References Cited

U.S. PATENT DOCUMENTS

| | | | |
|---|---|---|---|
| 4,821,312 | 4/1989 | Horton et al. | 379/100 |
| 4,868,865 | 9/1989 | Ogawa et al. | 379/100 |
| 4,972,457 | 11/1990 | O'Sullivan . | |
| 5,127,047 | 6/1992 | Bell et al. | 379/100 |
| 5,159,624 | 10/1992 | Makita | 379/57 |
| 5,173,933 | 12/1992 | Jabs et al. . | |
| 5,276,729 | 1/1994 | Higuchi et al. | 379/58 |
| 5,307,399 | 4/1994 | Dai et al. | 379/57 |
| 5,311,570 | 5/1994 | Grimes et al. | 379/57 |
| 5,327,486 | 7/1994 | Wolff et al. . | |
| 5,335,276 | 8/1994 | Thompson et al. | 380/21 |
| 5,345,597 | 9/1994 | Strawczynski et al. | 455/450 |
| 5,422,733 | 6/1995 | Merchant et al. | 455/31.2 |
| 5,457,732 | 10/1995 | Goldberg | 455/31.3 |
| 5,546,442 | 8/1996 | Foladare et al. | 455/417 |
| 5,559,860 | 9/1996 | Mizikovsky | 455/31.2 |
| 5,590,133 | 12/1996 | Billstrom et al. | 455/433 |
| 5,644,626 | 7/1997 | Carlsen et al. | 455/31.2 |

FOREIGN PATENT DOCUMENTS

| | | |
|---|---|---|
| 0 376 527 A2 | 7/1990 | European Pat. Off. . |
| 0 503 813 A2 | 9/1992 | European Pat. Off. . |
| 0 580 116 A2 | 1/1994 | European Pat. Off. . |
| WO94/15431 | 7/1994 | WIPO . |

OTHER PUBLICATIONS

The IBM Personal Communicator—Design Considerations, IEEE, Apr. 1994, pp. 423–425.
"Simon" ad, Bellsouth, 1993.

*Primary Examiner*—Dwayne D. Bost
*Assistant Examiner*—William G. Trost

[57] ABSTRACT

With the advent of personal digital assistants (PDAs) having modems for information, e.g., facsimile and/or data, transmission over wireless connections, as well as the capability for voice communications, we have recognized that is possible to communicate with a person, wherever they are, in whatever form is desired. In order to do so in a manner that simulates the way a person at a fixed location having a separate telephone, fax machine and data modem would communicate, incorporate into a PDA is a) a receiver for a wireless actuation signal that indicates that a communication of some type is waiting for a called party; b) an outgoing connection origination unit that establishes a connection from the PDA to the waiting communication; c) a discriminator, which makes a determination as to the type of communication that is waiting; and d) a selection unit that routes the information signals received over the connection established by the PDA to an appropriate communication unit within the PDA, e.g., a fax modem, data modem, or voice communication unit, the appropriate communication unit being selected in response to the type of communication that was determined by the discriminator to be waiting. The PDA owner may optionally be alerted only when 1) an information transmission is successfully completed and the received information is waiting in the PDA for access by its owner, or 2) when a voice connection has successfully been established to the communication originator who continues to indicate a readiness to communicate.

25 Claims, 7 Drawing Sheets

5,894,595

1

PERSONAL MOBILE COMMUNICATION SYSTEM

This is a Continuation application Ser. No. 08/282,697 filed Aug. 1, 1994, now abandoned.

TECHNICAL FIELD

This invention relates to personal communications using a portable communications device such as a personal digital assistant and, more particularly, to systems for setting up communications between a caller and a called individual using a combination of paging and call bridging.

BACKGROUND OF THE INVENTION

A problem with setting up telecommunications connections today is the difficulty of locating called individuals who are highly mobile. This problem is partially alleviated by mobile telephone technology and radio paging systems. In one prior art system, described in copending application Ser. No. 07/843,685 assigned to the same assignee as the present application, a return telephone call is automatically placed from a personal communications unit of a called individual in response to a call from a caller and the called individual is alerted to the existence of the call placed to him only upon an indication that the call from the calling telephone remains in progress. This system assures the called individual that he will be connected to a call that continues to exist when the personal communications unit alerts so that he can speak to the calling party.

However, not all communication is in the form of voice. People also require information communication, which includes facsimile (fax) and data transmissions. Thus, there is a need in the art to provide information communication anytime and anywhere.

In one prior art solution for facsimiles, a facsimile transmitter initiates a call to the intended recipient's fax number, which is routed to a store and forward facsimile system. The facsimile system stores the transmitter's fax and then, in response to completion of the fax, transmits a paging signal to the pager of the intended recipient of the fax indicating that a fax is waiting. The paged recipient then proceeds to a facsimile machine which he uses to call into a predetermined number and retrieve his facsimile from the store and forward facsimile system.

SUMMARY OF THE INVENTION

With the advent of personal digital assistants (PDAs) and other portable communications devices having modems for information, e.g., facsimile and/or data, transmission over wireless connections, as well as the capability for voice communications, we have recognized that is possible to communicate with a person, wherever they are, in whatever form is desired. In order to do so in a natural manner, e.g., in a manner that simulates the way a person at a fixed location having a separate telephone, fax machine and data modem would communicate, we incorporate into a PDA or other similar portable communication devices capable of receiving multimode calls, e.g., voice, facsimile, data, or a combination thereof, in accordance with the principles of the invention, a) a receiver for a wireless actuation signal that indicates that a communication of some type is waiting for a called party; b) an outgoing connection origination unit that establishes a connection from the PDA to the waiting communication; c) a discriminator, which makes a determination as to the type of communication that is waiting; and d) a selection unit that routes the information signals received over the connection established by the PDA to an appropriate communication unit within the PDA, e.g., a fax modem, data modem, or voice communication unit, the appropriate communication unit being selected in response to the type of communication that was determined by the discriminator to be waiting. If call screening mode is not active, the PDA owner may optionally be alerted only when 1) an information transmission is successfully completed and the received information is waiting in the PDA for access by its owner, or 2) when a voice connection has successfully been established to the communication originator who continues to indicate a readiness to communicate. If call screening is active, the PDA displays an indication of the identity of the calling party so that the called party can decide if he wishes to communicate with that person by having the call completed. If the called party decides he wishes to communicate with the calling party, he actuates the PDA which then continues the above-described process.

In accordance with an aspect of the invention, the PDA can include communication apparatus for accessing communication channels other than telephone channels, e.g., packet data channels. Optionally, if the caller's call is an information, i.e., data or facsimile, call, the PDA accesses the best type of channel, e.g., the lowest cost or highest bandwidth, as specified by the PDA owner, for retrieving the information and, accordingly, selects the proper data protocol. Any necessary protocol conversions are performed by one of the networks through which the information must pass.

In a particular embodiment of the invention, the PDA includes a) a paging receiver that receives as part of a paging signal an indication as to which of a voice call, facsimile call or data call is waiting for a called party; b) an outgoing call placement unit that places a second telephone call to connect the PDA directly, or through a delay unit, e.g., a store and forward unit, to the calling party; and c) a controller that determines whether the call is routed to the fax modem, data modem, or alerter and voice communication unit within the PDA, the determination being based on the type of call that was indicated to be waiting by the actuation signal.

In another embodiment of the invention, the paging signal does not indicate the type of call that is waiting. Instead, information indicating the type of call that is waiting is contained in a signal received over the outgoing connection that is established by the PDA. The PDA then activates the appropriate one of its alerter and voice communication unit, fax modem, or data modem in response to the received signal.

In either of the foregoing exemplary embodiments, in accordance with the principles of the invention, the PDA owner is only alerted 1) after the information transmission has successfully completed and the received information is waiting in the PDA for the owner, or 2) when a connection has successfully been established to a so-called "meet me" unit and an indication is received therefrom indicating that the caller remains on the call, unless the call screening mode is active.

DETAILED DESCRIPTION

Figure 1:
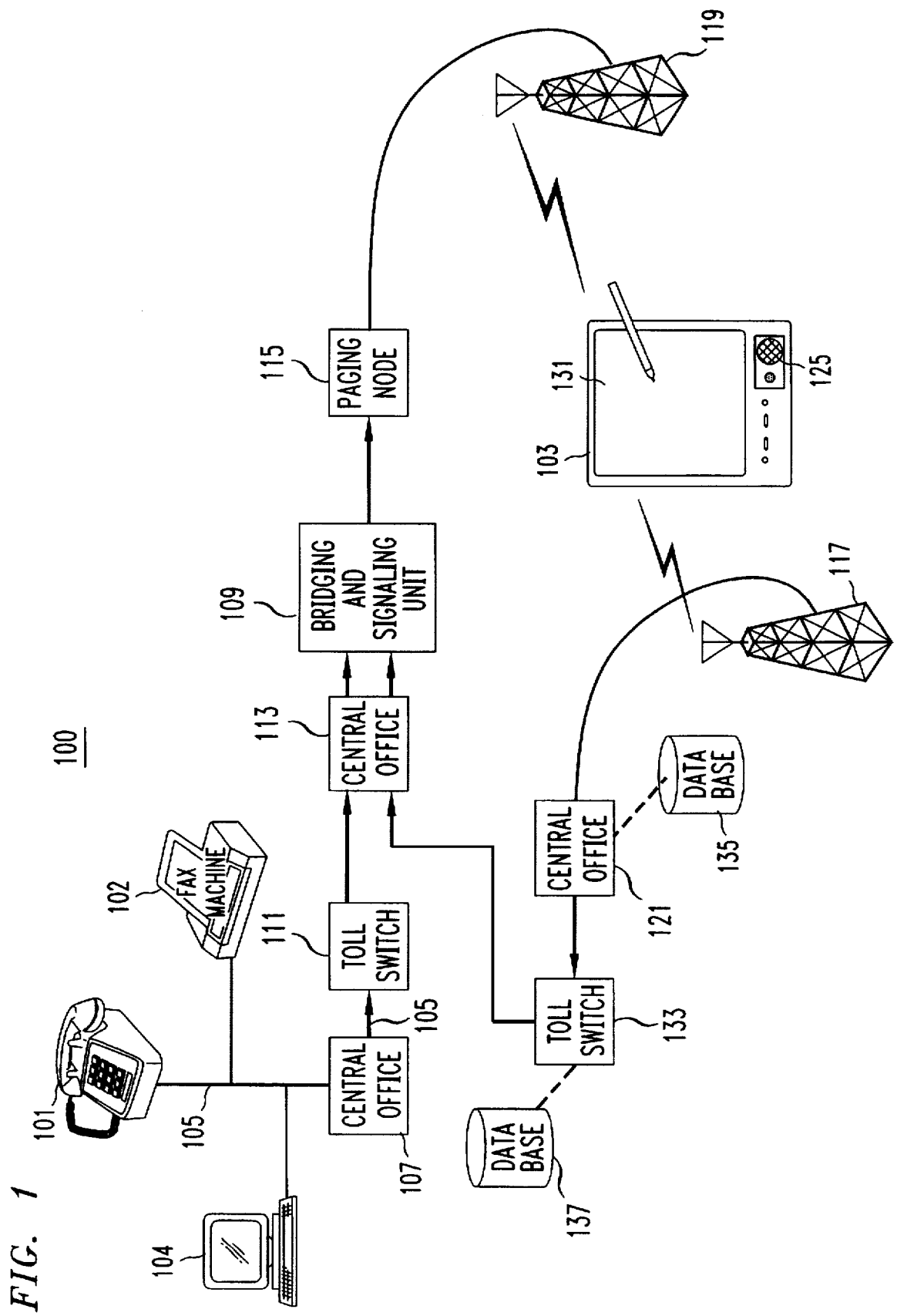
FIG. 1 shows an arrangement for providing transparent personal telecommunications services, in accordance with the principles of the invention.

FIG. 1 shows arrangement 100 for providing transparent personal telecommunications services, in accordance with the principles of the invention. A caller places a telephone call from a) calling telephone 101, b) fax machine 102 or c) data terminal 104, having a built-in data modem, to the personal telephone number of an individual associated with, e.g., owner of, personal digital assistant (PDA) 103. The caller's telephone call passes over telephone line 105 to central office 107. Central office 107, in turn, routes the call to bridging and signaling unit 109, which is associated with the called number. PDA 103 is also associated with the called personal telephone number, as discussed further below.

Current United States telephone practices generally require that at least the one local exchange carrier (LEC), containing central office 107, routes the caller's telephone call. Also, the caller's telephone call may be routed via an inter-exchange carrier, represented by toll switch 111, and another local exchange carrier, represented by central office 113. Central offices 107 and 113 may be the same office. If so, the call would not pass through any inter-exchange carrier or any other central offices.

Bridging and signaling unit 109 is a so-called "meet me bridge" or "meet me unit" for connecting at least two incoming communications to each other. Upon receipt of the caller's telephone call, bridging and signaling unit 109 forwards paging information to paging node 115. The paging information includes a predetermined code that uniquely identifies the called individual's PDA 103 and, if not predetermined, an identification of a location to which a return connection, e.g., telephone call which may carry modulated data or a data connection, must be established, in order to connect with or "meet" the caller's call. If the return connection is to be a telephone call, the identity of the location to which the return connection is to be made is in the form of a telephone number and the return connection is known as the return call. Optionally, the paging information includes an indication of the type of call being made to the PDA. It is noted that a copy of the predetermined code is stored within PDA 103. Paging node 115 causes a paging signal containing the paging information to be broadcast from paging tower 119. Paging systems are well known in the art.

The telephone number of the return connection may be a translatable, e.g., 800-type, of telephone number. An advantage of using an 800-type of telephone number is that it allows PDA 103 to place the return connection without having any information about the area code of the telephone line to which it is connected. This is because calls to 800-type telephone numbers are unlike calls to conventional telephone numbers. Calls to conventional telephone numbers employ the area code for routing purposes. Such calls require the explicit dialing of the area code of the destination location for calls placed from one area code to another and that no area code be dialed for calls placed within a single area code. However, 800-type telephone numbers employ the 800 area code to indicate that the telephone network should translate the telephone number to its corresponding destination location. As such, the 800 area code must always be dialed for such calls to give this indication to the telephone network, even if the destination location is within the same area code as the location of the caller.

PDA 103 receives paging signals transmitted from paging tower 119. In the event that the code contained within the paging information of a paging signal matches the predetermined code stored in PDA 103, and call screening is not being employed, PDA 103 automatically establishes a connection, which is the return connection or call, to the location, e.g., telephone number or data address, specified in that page, over a communication channel, e.g., a wireless communication channel. As such, central office 121, which is a mobile telephone switching office (MTSO), receives the return connection via antenna 117, and routes it to bridging and signaling unit 109. To this end, central office 121 may route the call via an inter-exchange carrier, represented by toll switch 133, and another local exchange carrier, represented by central office 113. The routing of return connections to 800-type telephone numbers follows well-known practices in the art for routing calls to 800-type telephone numbers. U.S. Pat. No. 4,191,860 issued to R. P. Weber on Mar. 4, 1980, describes one system for routing and translating 800-type numbers. The association of central office 121 with database 135 and toll switch 133 with database 137 aids in the routing process.

Unless call screening is employed, PDA 103 alerts the called individual to the existence of a voice telephone call placed to his personal number only upon an indication that the call from calling telephone 101 remains in progress, in accordance with an aspect of the invention. To this end, upon receipt of the return connection, bridging and signaling unit 109 continually determines if the call from telephone 101 remains in progress. As long as the call from telephone 101 remains in progress, bridging and signaling unit 109 sends a so-called "in-progress" signal, over the return connection, to PDA 103. PDA 103 begins to alert upon receipt of the in-progress signal. Furthermore, in accordance with an aspect of the invention, personal communications unit 103 continues to alert only during continued reception of the in-progress signal or until it detects telephone 125 having gone off-hook while PDA 103 was still alerting. To complete the caller's call, in accordance with aspects of the invention, PDA 103 connects speakerphone 125 to the wireless telephone call if the owner of PDA 103 takes it off-hook while it is alerting. At that time, bridging and signaling unit 109 connects the caller's call from telephone 101 to the return connection. As a result of these connections, the caller at telephone 101 can converse with the called individual at telephone 125.

In accordance with the principles of the invention, PDA 103 does not alert the called individual as to the existence of an information call upon a) receiving a page indicating an information call or b) connecting to bridging and signaling unit 109 when the type of call is not contained in the paging information. Instead, PDA 103 immediately establishes the return connection and, upon its successful establishment, PDA 103 automatically engages in information transfer with bridging and signaling unit 109 until all the information is received and stored in PDA 103. The received information may be stored in a file. In accordance with an aspect of the invention, only once the information transfer is complete does PDA 103 alert, the called individual. Thus, advantageously, the called individual is not disturbed until PDA 103 has useful information to present to him.

It is noted that the useful information may be that the desired information could not be correctly received. To this end, PDA 103 may give a first type of alerting, e.g., a particular tone pattern, if the information was successfully transferred to PDA 103, and a second type of alerting, e.g., a different particular tone pattern, if the information transfer was not successful. For successful information transfers the alerting may include a display of the name of the received file.

Figure 2:
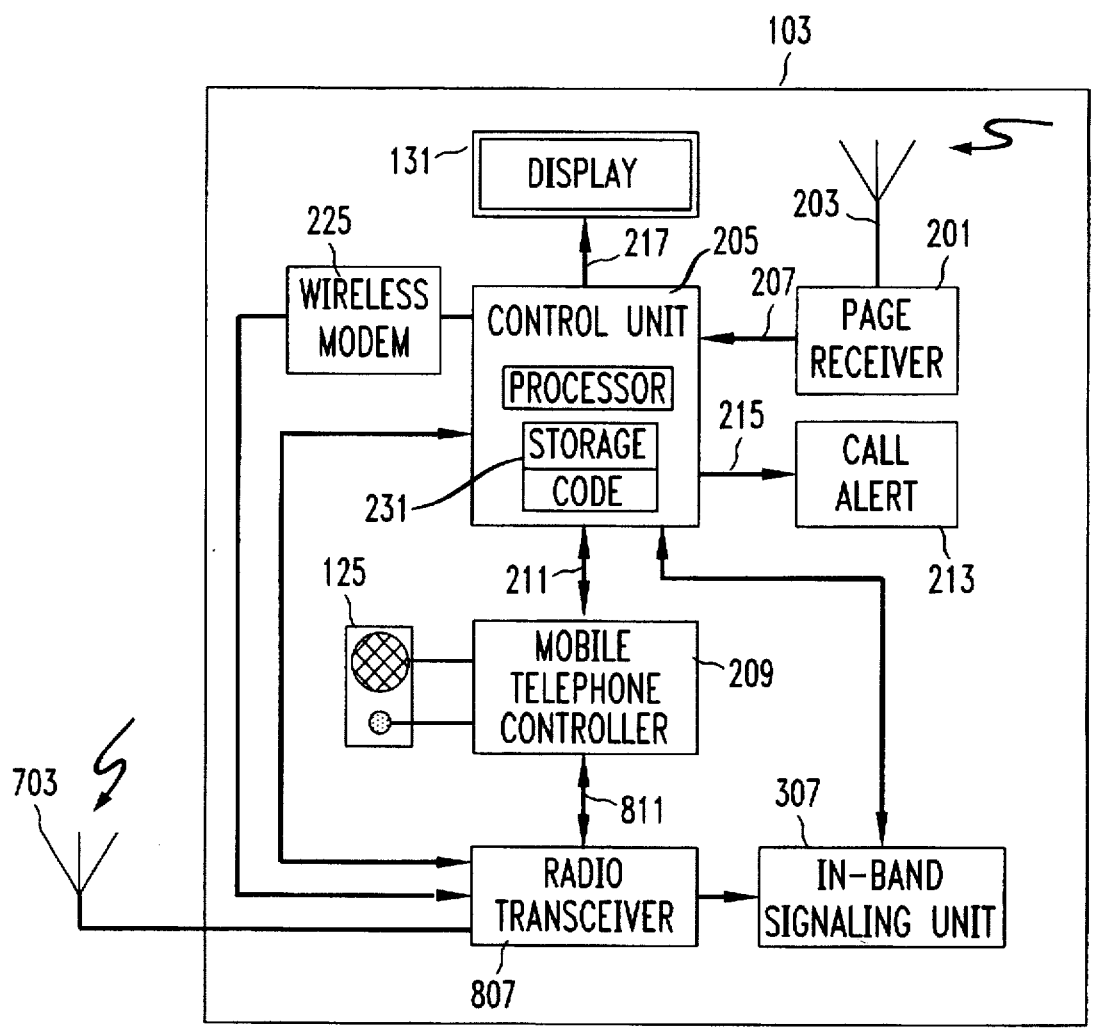
FIG. 2 shows, in block diagram form, a more detailed view of a personal communications unit shown in FIG. 1.

FIG. 2 shows, in block diagram form, a more detailed view of the communication apparatus of PDA 103. Page receiver 201 receives paging signals transmitted from paging tower 119 via paging antenna 203. Page receiver 201 also stores the predetermined code associating an individual with PDA 103. Mobile telephone controller 209 controls the mobile telephone functions of PDA 103 and it is connected to the speaker and microphone that make up speakerphone 125. Link 811 connects mobile telephone controller 209 to radio transceiver 807. Link 211 connects mobile telephone controller 209 to control unit 205. Wireless modem 225 is also connected to control unit 205 and radio transceiver 807. Wireless modem 225 is able to receive and transmit both conventional data and conventional facsimile signals.

In response to the reception of a paging signal containing paging information having this PDA's particular code, page receiver 201 sends to control unit 205, over link 207, the received indication of the location to which PDA 103 must establish the return connection. As noted, this location indication, e.g., a telephone number, if not predetermined, is part of the paging information.

If the paging information includes an indication of the type of call, e.g., voice or information, control unit 205 cooperates with mobile telephone controller 209 or wireless modem 225 to establish the return connection to the proper location over an available wireless channel. To this end, radio signals are transmitted and received by radio transceiver 807, via antenna 703. The wireless channel may, but need not, e.g., for information calls, be dedicated to the return connection.

In accordance with an aspect of the invention, for voice telephone calls, if the return connection is successfully placed and PDA 103 receives an in-progress signal indicating that the caller's telephone call continues to be in progress, control unit 205 signals call alert 213, over link 215, to begin generating an alerting indication. In one embodiment, the alerting indication is a predetermined beeping tone. Optionally, control unit 205 supplies to display 131, over link 217, the identity of the caller, if that information is available. Either a portion of the paging signal or signals supplied over the channel of the return connection may provide the caller identity.

If call screening is employed, PDA 103 begins alerting upon receipt of the paging information. A return connection need not be immediately established. Instead, PDA 103 conveys to its owner, e.g., by displaying on the screen or by audibly announcing, an indication of the caller's identity. Such an indication may be the caller's name, telephone number or a personal identification number. Typically, identifying information is contained as part of the paging information. The PDA owner then determines if he desires to communicate with the calling party. If so, he indicates his desire to PDA 103, which then establishes the return connection. PDA 103 need not attempt to determine the presence of an in-progress signal, as the PDA owner has already been disturbed. However, if the calling party is no longer available upon completion of the return connection, some indication should be given to the called party.

If the caller's call is an information call, e.g., fax or data, in response to receipt of a paging signal that includes paging information matching PDA's 103 particular code stored in page-receiver 201, PDA 103 establishes a return connection, e.g., a telephone call or a packet data call, to either a predetermined location or a location supplied to control unit 205, over link 207, which was received as part of the paging information. If the call type is indicated by the paging information, control unit 205 determines the best available channel, e.g., cheapest or fastest, given parameters supplied by the PDA owner, for establishing the return connection, based on the indicated call type. Control unit 205 cooperates with either mobile telephone controller 209 or wireless modem 225, whichever has call origination circuitry, to establish the return connection over an available wireless channel. If the call type was not indicated by the paging information, upon the successful establishment of the return connection, bridging and signaling unit 109 transmits to control unit 205 a message indicating the call type. Information is then transmitted from bridging and signaling unit 109 to PDA 103 over the return connection via wireless modem 225. The information is stored in storage 231.

In accordance with an aspect of the invention, upon successful completing the information transfer, control unit 205 indicates to call alert 213, over link 215, to begin generating an alerting indication. In one embodiment, the alerting indication is a predetermined beeping tone. Optionally, control unit 205 supplies to display 131, over link 217, the identity of the caller, if that information is available. Advantageously, the PDA owner is not disturbed by the alerting until the information is successfully transferred to the PDA.

Figure 3:
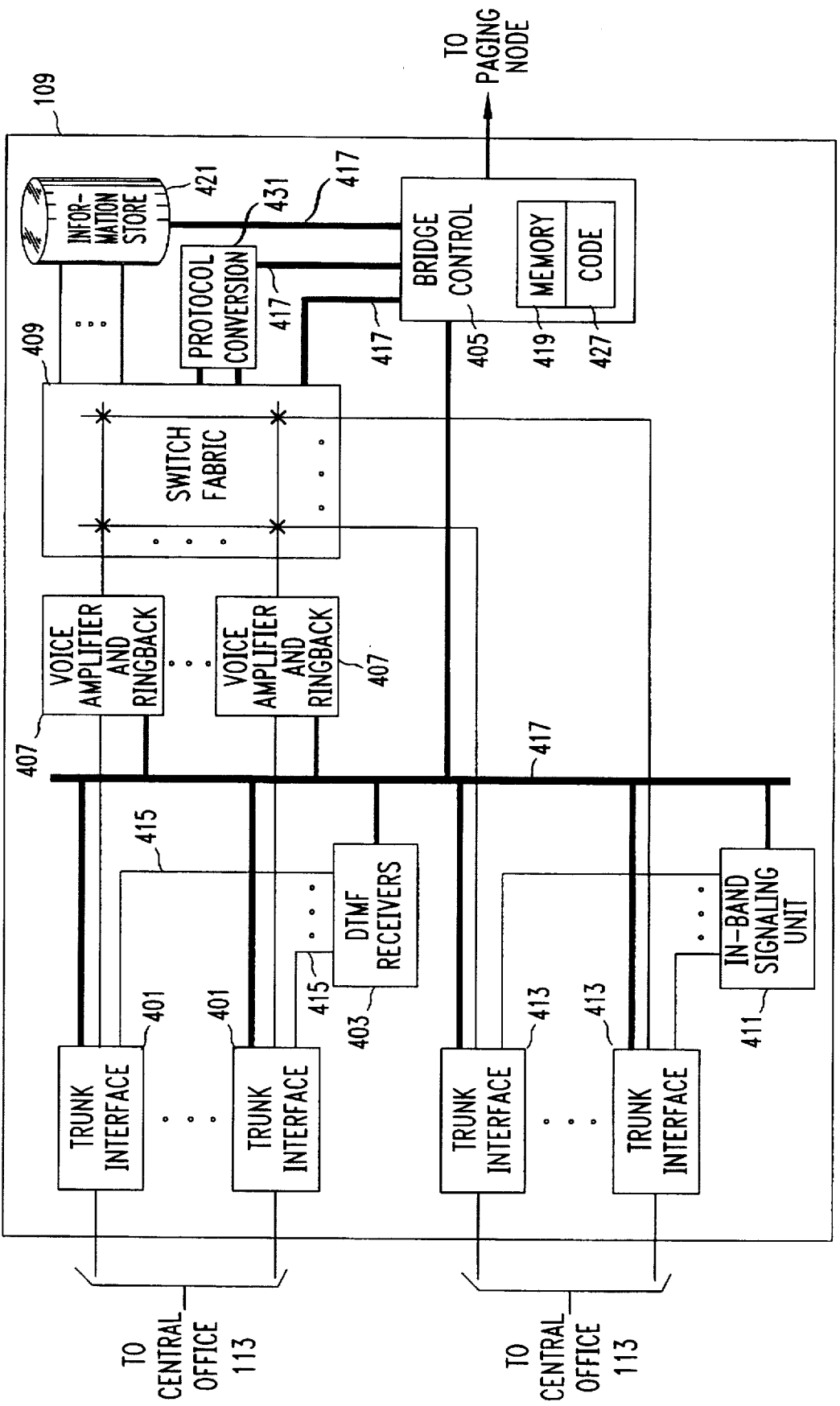
FIG. 3 shows, in block diagram form, an expanded view of the bridging and signaling unit shown in FIG. 1.

FIG. 3 shows, in block diagram form, an expanded view of bridging and signaling unit 109. Bridging and signaling unit 109 includes: a) trunk interfaces 401, b) DTMF receivers 403, c) bridge control 405, d) voice amplifier and ringback units 407, e) switch fabric 409, f) in-band signaling unit 411, g) trunk interfaces 413 h) information store 421 and i) protocol conversion unit 431. Bridge control 405 controls and coordinates the operation of bridging and signaling unit 109 by communicating commands and information over control bus 417.

Calls placed by callers to personal numbers of individuals associated with a PDA 103 are received and terminated at bridging and signaling unit 109 by one of trunk interfaces 401. In one embodiment, the interface between central office 113 and trunk interfaces 401 is the same type of interface employed to connect a central office to a PBX equipped for direct inward dialing (DID). As part of terminating a call, central office 113 sends the last four digits of the personal telephone number to bridging and signaling unit 109 over the trunk. These digits are sent as DTMF signals. One of DTMF receivers 403 receives the DTMF signals over one of lines 415 and decodes them. It informs bridge control 405 at which of trunk interfaces 401 the call arrived and the decoded four digits.

In response to the reception of the four decoded digits, bridge control 405 instructs one of voice amplifier and audible ring units 407 to supply ringback tone over the one of trunk interfaces 401 at which the call arrived. Answer supervision is supplied so that the type of call may be determined. Since answer supervision is supplied, the caller is charged for the call until it is answered by the called party.

The call is then forwarded to protocol conversion unit 431 to determine the call type.

Bridge control 405 contains memory 419 which includes both data storage and code for operating bridge control 405. Memory 419 maps the received four digits of the called individual's personal telephone number to the predetermined code stored in the PDA 103 associated with the called individual. Bridge control 405 selects an idle one of trunk interfaces 413 at which to receive the return connection. The trunks connecting central office 113 to trunk interfaces 413 are dedicated trunks and each has its own location indication, e.g., telephone number. Thereafter, bridge control 405 supplies to paging node 115 (FIG. 1) a) the telephone number of the trunk associated with the selected idle one of trunk interfaces 413, as the number for the return connection, b) the predetermined code of the called individual, and, optionally, c) the call type, e.g., voice or information.

Upon receipt of a return connection at the selected one of trunk interfaces 413, bridge control 405 determines which of trunk interfaces 401 holds the call of the caller that corresponds to this return connection. In accordance with an aspect of the invention, if the caller's call is 1) a voice call, 2) still in progress, and 3) call screening is not being employed, bridge control 405 causes in-band signaling unit 411 to transmit an in-progress signal to PDA 103. If the called individual goes off-hook at telephone 125 (FIG. 1), in-band signaling unit 411 receives a signal from PDA 103 indicating this. In response to this signal, bridge control 405 commands switch fabric 409 to interconnect the caller's call with its respective return connection. Bridge control 405 also commands the respective one of voice amplifier and ringback units 407 to cease supplying ringback tone to the caller and to switch to amplification mode. This is necessary because a back-to-back connection of two separate telephone calls requires amplification to overcome the attendant loss of signal strength. Simultaneously, bridge control 405 commands trunk interface 401 to return the well-known answer supervision signal to the caller's call.

If the caller's call is determined to be an information call, and information begins to be received at bridging and signaling unit 109 prior to the establishment of the return connection, it is necessary to insure that the information is transmitted to PDA 103 and not lost. Therefore, such information is stored in information store 421. To this end, switch fabric 409 connects the caller's call to information store 421 until the return connection is established. Upon receipt of the return connection, it is connected through switch fabric 409 to protocol conversion unit 431, to determine the protocol being used by the return connection. For example, if the return connection employs the well known cellular digital packet data (CDPD) over the wireless connection to central office 121, it is likely that the packet data is being transmitted to bridging and signaling unit 109 using the well known frame relay protocol. However, the caller's call may be transmitted over wired lines from a facsimile machine using a conventional fax modem.

If the caller's call and the return connection are both employing the same protocol, a direct connection may be established between them via switch fabric 409. If the caller's call and the return connection are both employing different protocols, they are connected together via switch fabric 409 and protocol conversion unit 431, so that protocol conversion unit 431 may perform the necessary protocol conversion. In either case, if information from the caller's call is stored in information store 421, the return connection is connected to the caller's call through information store 421. The initially stored information may thus be first supplied to PDA 103 while further information that continues to arrive on the caller's call is buffered in information store 421. Advantageously, buffering the information permits the resending of all or part of the information in the event of a transmission error. Upon successfully transmitting the information, it is deleted from information store 421.

Figure 4:
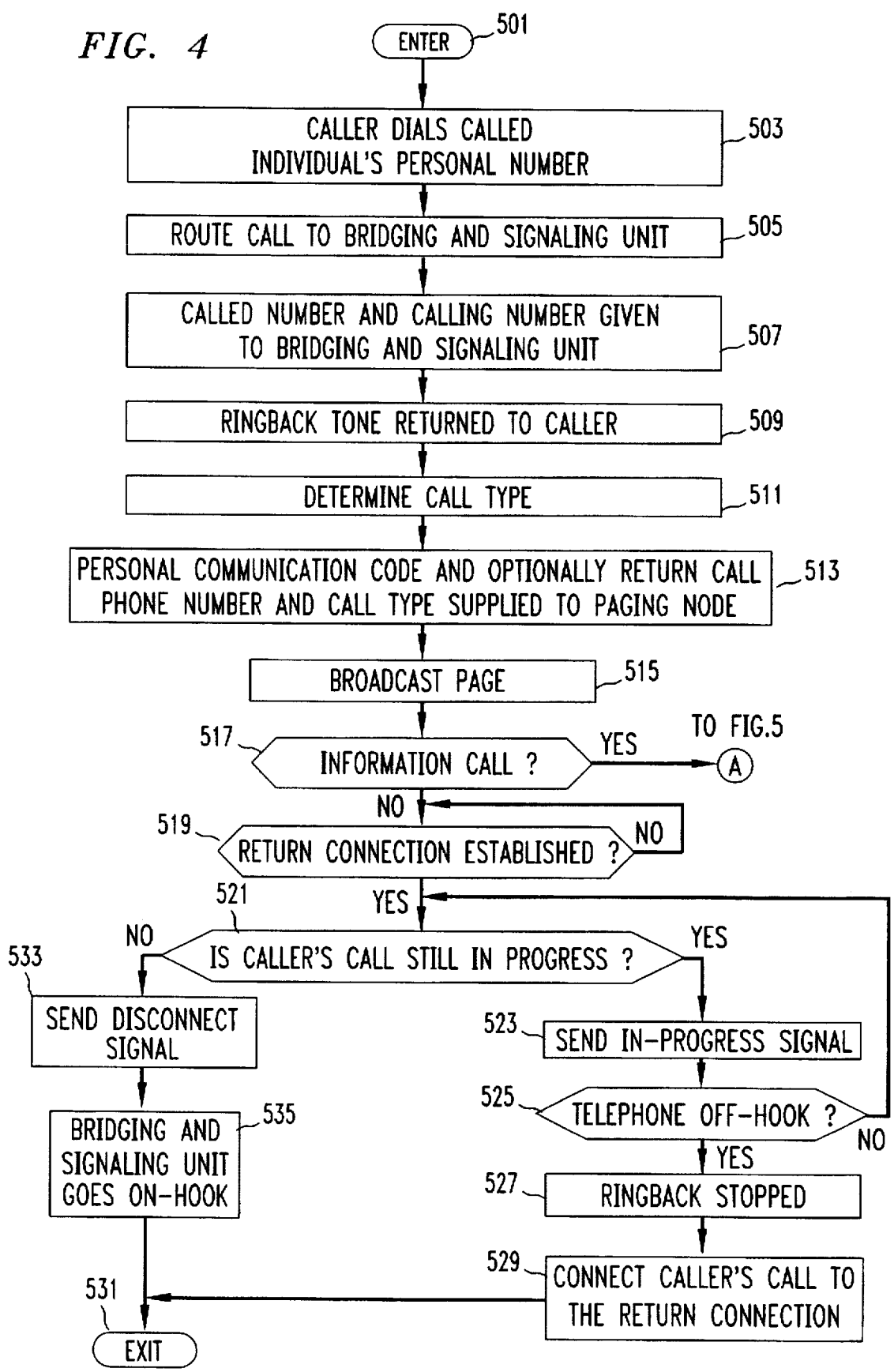
FIGS. 4 and 5, when connected together, show a flow chart of an exemplary process for completing a call placed to the personal number of an individual associated with the personal communications unit shown in FIG. 1.
Figure 5:
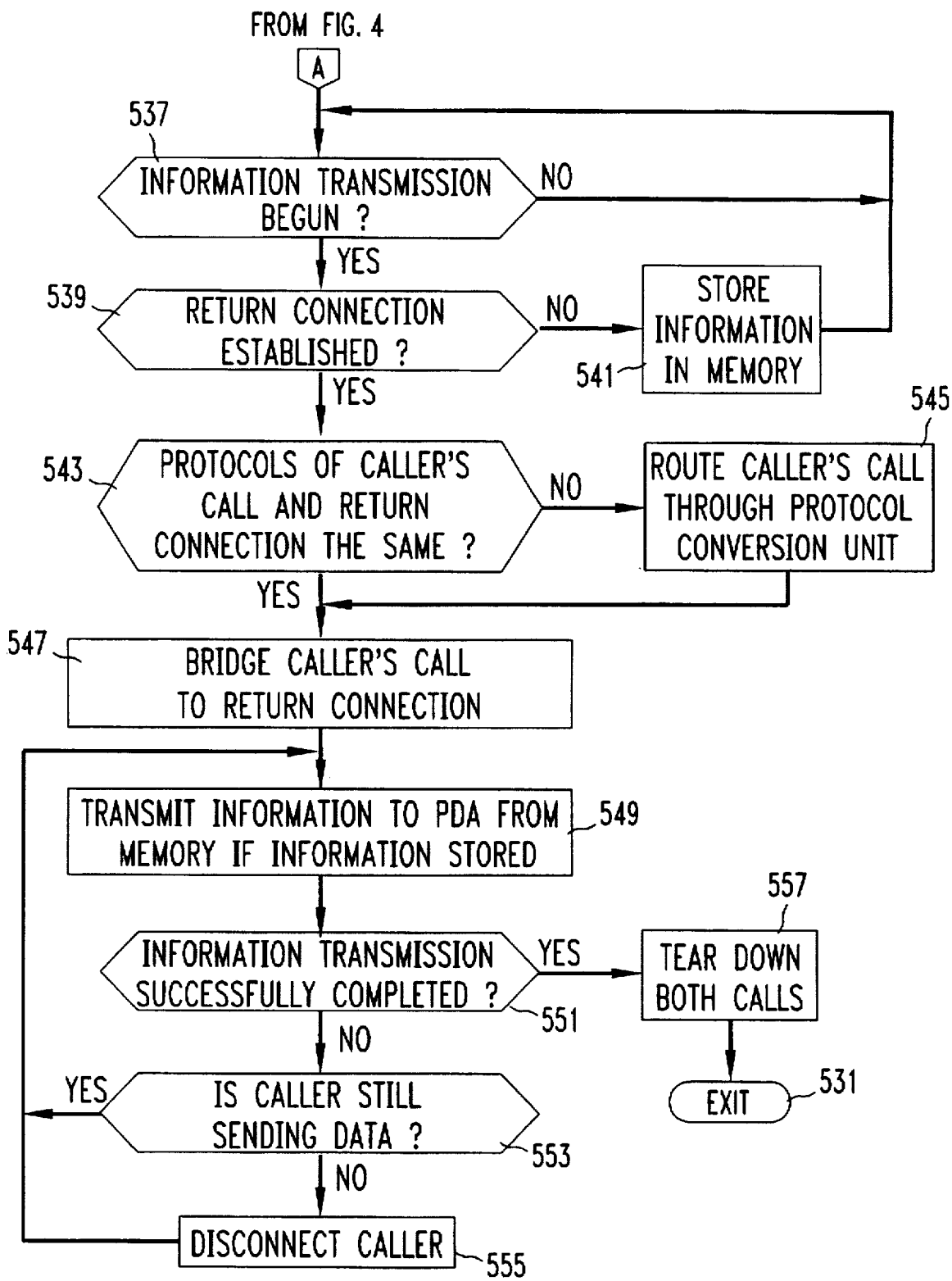

FIGS. 4 and 5, when connected together, show a flow chart of an exemplary process performed in the telecommunications equipment outside of PDA 103 for completing a call placed to the personal number of a called individual associated with one of PDA 103 (FIG. 1). The process begins in step 501 (FIG. 4) when a caller at calling telephone 101 (FIG. 1), fax machine 102, or terminal 104 decides to place a call to the personal number of the individual associated with PDA 103. To this end, in step 503, the caller dials the called individual's personal number from the calling device. A local exchange carrier (LEC) routes the call to bridging and signaling unit 109 in step 505. Thereafter, in step 507, the LEC supplies the called number and, if available, the calling number to bridging and signaling unit 109.

In step 509, bridging and signaling unit 109 supplies ringback tone to telephone 101. Next, in step 511, the type of call being originated, i.e., information or voice, is determined. Bridging and signaling unit 109 sends to paging node 115 the paging information, i.e., the predetermined code of the called individual that is stored within PDA 103 and, optionally, the telephone number to which the return connection must be made and the call type, in step 513. In step 515, paging tower 119 broadcasts a paging signal that includes the paging information. Next, conditional branch point 517 tests to determine if the caller's call is an information call.

If the test result in step 517 is NO, indicating that the caller's call is a voice call, control passes to conditional branch point 519, which tests to determine if the return connection has been received from PDA 103. If the test result in step 519 is NO, control passes back to step 519 to await the return connection. If a predetermined time has passed, the process may be exited. If the test result in step 519 is YES, control passes to conditional branch point 521, in which bridging and signaling unit 109 tests to determine if the caller's call remains in progress. If the test result in step 521 is YES, control passes to step 523, in which bridging and signaling unit 109 sends an in-progress signal from in-band signaling unit 411.

Control next passes to conditional branch point 525, which tests to determine if PDA 103 has taken speakerphone 125 off-hook. If the test result in step 525 is NO, control passes back to conditional branch point 521, which tests to determine if PDA 103 continues to receive the in-progress signal. If the test result in step 525 is YES, control passes to step 527 in which bridging and signaling unit 109 stops sending ringback tone to telephone 101. Next, in step 529, switch fabric 409 (FIG. 3) interconnects the caller's call and the return connection at bridging and signaling unit 109. This allows the caller to talk with the called individual. The process is then exited in step 531.

If the test result in step 521 is NO, bridging and signaling unit 109 sends a disconnect signal to PDA 103 in step 533. Next, bridging and signaling unit 109 goes on-hook, in step 535. Thereafter, the process is exited in step 531.

If the test result in step 517 is YES, indicating that the caller's call is an information call, i.e., fax or data, control passes to conditional branch point 537, which tests to determine if information transmission from the caller's location has begun. If the test result in step 537 is NO, control loops back to step 537 to await the beginning of information transmission. A time limit may be set which, if exceeded, will cause the process to be exited. If the test result in step 537 is YES, control passes to conditional branch point 539, which tests to determine if a return connection has been established. If the test result in step 539 is NO, control passes to step 541, in which bridging and signaling unit 109 causes the information source to be connected to memory for this call in information storage 421. Control then passes back to step 537.

If the test result in step 539 is YES, indicating that, in response to the page, PDA 103 has established a successful return connection, control passes to conditional branch point 543, which tests to determine if the communication protocols of the caller's call and the return connection are the same. If the test result in step 543 is NO, control passes to step 545, in which bridging and signaling unit 109 sets up a path for the information through protocol conversion unit 431. If the test result in step 543 is YES, or after execution of step 545, control passes to step 547, in which the caller's call is bridged to the return connection. Next, in step 549, the information is transmitted from bridging and signaling unit 109 over the return connection to PDA 103. This transmission is performed by including the memory of information store 431 as a delay in the transmission path if any information has been stored in step 541. Thus, the stored information is first transmitted while additional incoming information continues to be stored for transmission at the appropriate time in a first in, first out fashion. When the memory for this information transfer is empty, it may be retained in the path with essentially zero delay or it may be bypassed.

Conditional branch point 551 tests to determine if the information transmission has successfully completed. If the test result in step 551 is NO, control passes to conditional branch point 553, which tests to determine if the caller is still sending data. If the test result in step 553 is YES, indicating that the caller has not yet transmitted all the information to bridging and signaling unit 109, control passes back to step 549 and information transmission continues from the caller to PDA 103. If the test result in step 553 is NO, indicating that the caller has transmitted all the information to bridging and signaling unit 109, control passes to step 555, in which the caller is disconnected. Control then passes back to step 549 to continue transmitting any previously stored information to PDA 103.

If the test result in step 551 is YES, indicating that the information transmission has successfully completed, control passes to step 557 and both connections are torn down. The process then exits in step 531.

Figure 6:
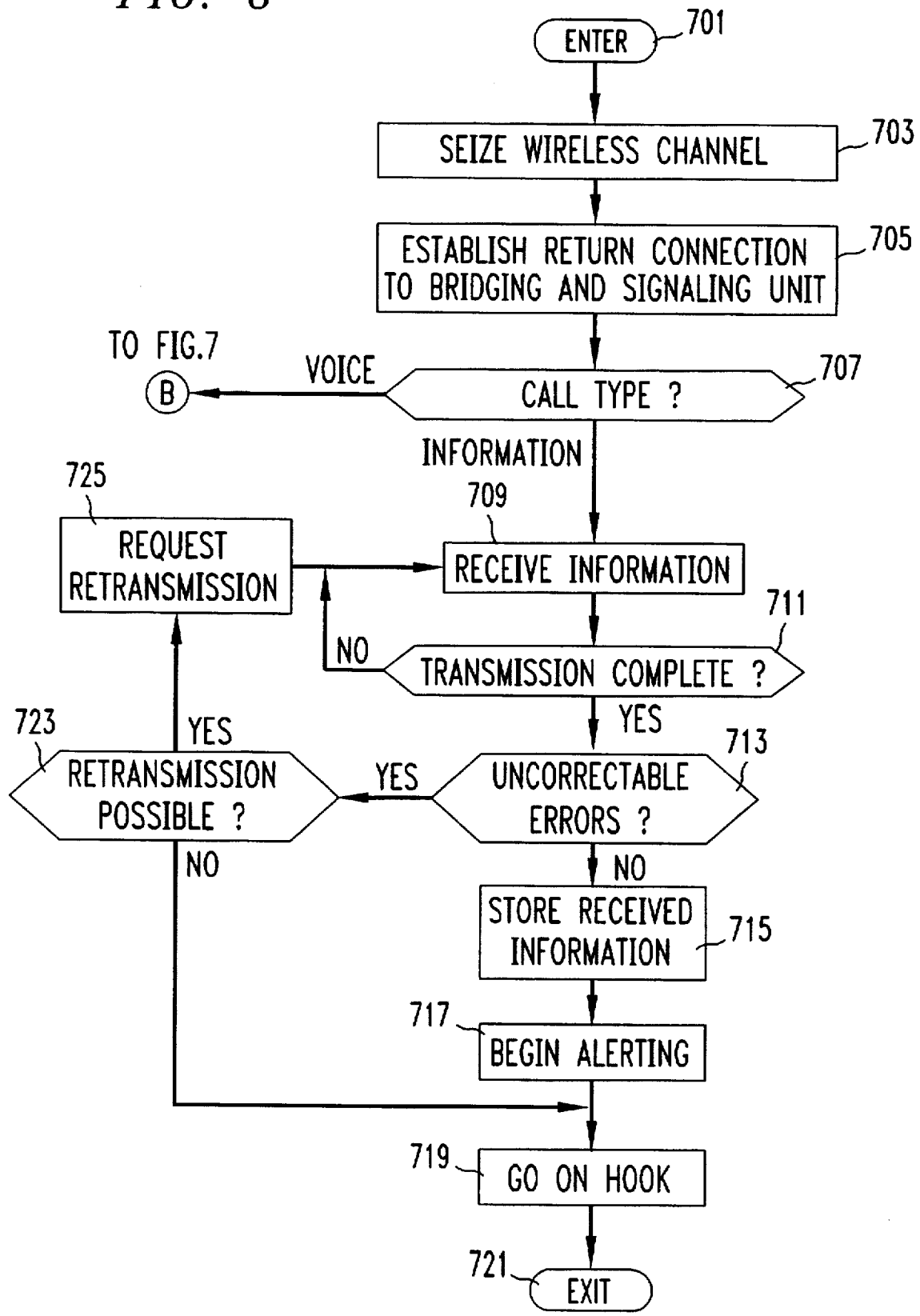
FIGS. 6 and 7, when connected together, show a flow chart of an exemplary process performed by the PDA of FIGS. 1 and 2 for completing an information transfer or establishing a voice telephone call.
Figure 7:
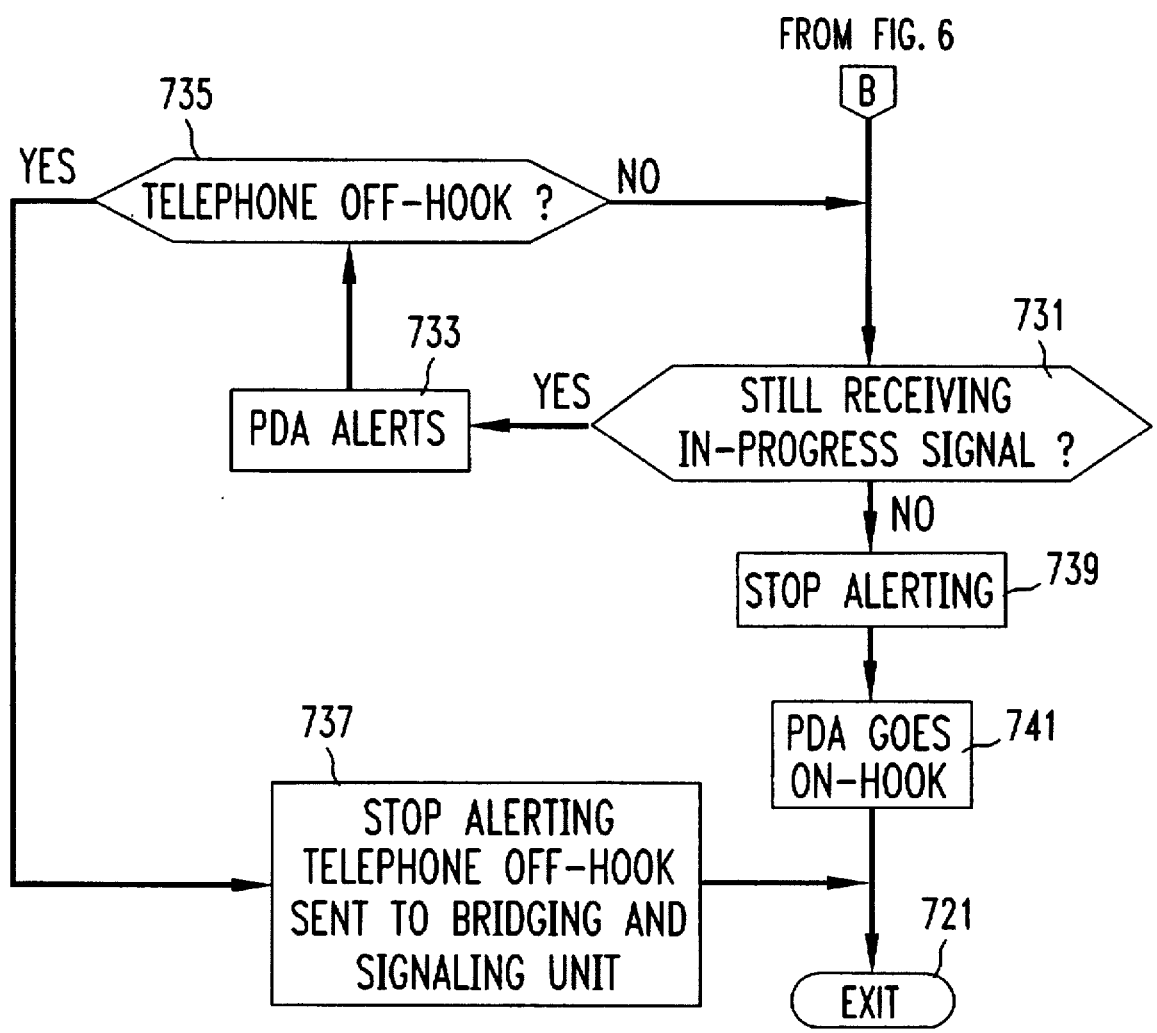

FIGS. 6 and 7, when connected together, show a flow chart of an exemplary process performed by PDA 103 for completing an information transfer or establishing a voice telephone call. The process begins in step 701 when PDA 103 receives the paging signal. Next, in step 703, PDA 103 seizes a wireless communication channel, e.g., a telephone channel or a CDPD channel. In one embodiment of the invention, the type of channel may be determined in response to the call type received in the paging information and prestored parameters of the PDA owner. In step 705, PDA 103 establishes the return connection to bridging and signaling unit 109. This may be achieved by dialing a telephone number, e.g., an 800-type telephone number, received as part of the paging information or establishing a packet data session. Central office 121 routes the return connection through to bridging and signaling unit 109.

Conditional branch point 707 tests to determine the call type, e.g., information or voice. In one embodiment of the invention, this test is performed by examining the type signal supplied as part of the paging information. In another embodiment of the invention, the call type may be supplied from bridging and signaling unit 109 as an in-band signal over the return connection. If the test result in step 707 is INFORMATION, indicating that the caller has placed an information call, control passes to step 709, in which PDA 103 begins to receive the information being transmitted from bridging and signaling unit 109. The information is stored in storage 231, e.g., in a file.

Next, conditional branch point 711 tests to determine if the information transmission is complete. If the test result in step 711 is NO, indicating that information continues to be transmitted, control passes back to step 709 to receive additional information. If the test result in step 711 is YES, control passes to conditional branch point 713, which tests to determine if any uncorrectable errors occurred during the course of transmission.

In accordance with the principles of the invention, if the test result in step 713 is NO, indicating that any errors in the received information have been corrected, and thus the information received is valid and complete, control passes to step 717, in which PDA 103 begins alerting. The alert may be a distinctive tone that distinguishes an information call from a voice call, thus informing the PDA owner that information now resides in the PDA for access at his convenience. Furthermore, the alerting may also distinguish between the types of information that may be received, e.g., data or facsimile, as well as the urgency of the information. The alerting may continue indefinitely or may only continue for a predetermined time period. Both audible and visual alerting may be supplied and these may each continue for independent time periods. Control then passes to step 719 and PDA 103 goes on-hook, thus causing the return connection to be torn down. The process is then exited in step 721.

In accordance with an aspect of the invention, if the test result in step 713 is YES, indicating that errors in the received information could not be corrected, and thus the information received is invalid or incomplete, control passes to conditional branch point 723, in which PDA 103 tests to determine if retransmission of the information is possible. Retransmission would be possible if the information remained stored in information store 421 in bridging and signaling unit 109 or if the transmitting unit, e.g., fax machine 102 or terminal 104, has retransmission capabilities. Such retransmission capabilities would be indicated to PDA 103 as handshaking information prior to the start of information transfer.

If the test result in step 723 is YES, indicating that retransmission is possible, control passes to step 725, in which PDA 103 requests retransmission of the information. Control then passes back to step 709 to receive the retransmission. If the test result in step 723 is NO, indicating that retransmission is not possible, control passes to step 719, in which PDA 103 goes on-hook. It is noted that even if retransmission capabilities are available, if retransmission has been attempted more than a predetermined number of times, step 723 may determine that retransmission is not possible. The process is then exited in step 721.

If the test result in step 707 is VOICE, indicating that the caller has placed a voice call, control passes to conditional branch point 731, which tests to determine if the caller's call is still in-progress, i.e., is the in-progress signal from bridging and signaling unit 109 continuing to be received. If the test result in step 731 is YES, control passes to step 733, in which PDA 103 begins alerting in response to reception of the in-progress signal. Control next passes to conditional branch point 735, which tests to determine if PDA 103 (FIG. 1) has gone off-hook. If the test result in step 735 is NO, control passes back to conditional branch point 731. If the test result in step 735 is YES, control passes to step 737, in which PDA 103 sends to bridging and signaling unit 109 an in-band signal indicating that telephone 125 has gone off-hook. Also, alerting by PDA 103 ceases. The process is then exited in step 721. The caller and PDA owner may now converse with each other.

At the end of the conversation, either the caller or the called individual will go on-hook. At that time, the call between the on-hook party and bridging and signaling unit 109 is taken down. Furthermore, bridging and signaling unit 109 causes the call by the party not going on-hook to be taken down as well.

If the test result in step 731 is NO, control passes to optional step 739, in which PDA 103 stops alerting, if it had been alerting. Next, in step 741, PDA 103 goes on-hook, causing the return connection to be torn down. The process is then exited in step 721.

In another embodiment of the invention, bridging and signaling unit 109 does not supply a telephone number to paging node 115 for every return connection. Instead, each PDA 103 always places the return call to the same predetermined telephone number. Central office 121, toll switch 133 and central office 113 route return connections placed to this number to available ones of trunk interfaces 413. Upon completing the return connection to the supplied number, PDA 103 supplies, via in-band signaling unit 307 (FIG. 2), its predetermined code from page receiver 201 (FIG. 2). Bridging and signaling unit 109 receives this code via in-band signaling unit 111 and supplies the code to bridge control 405 (FIG. 4). Bridge control 405, employing memory 419, maps the received code to the one of trunk interfaces 401 holding the caller's call. If the caller's call is still in progress, in-band signaling unit 411 transmits the in-progress signal. Thereafter, the operation proceeds as described above.

In another embodiment of the invention, trunk interfaces 401 and 413 terminate all digital transmission facilities, e.g., T-1 or ISDN primary rate interfaces (PRI). However, the functionality of trunk interfaces 401 and 413, that of receiving, holding, and identifying telephone calls, remains the same. The design of such trunk interfaces is well known in the art. Also, such embodiments of the invention can include the processing of both in-band and out-of-band signals. To this end, in-band signaling units 307 (FIG. 3) and 411 are replaced by in-band or in and out-of-band signaling units. The design of such signaling units will be readily apparent to those skilled in the art.

As noted above, display 131 can display the number of the caller if PDA 103 receives the necessary information. The paging information may contain the caller's number. Alternatively, bridging and signaling unit 109 may supply the caller's number as part of the in-band signals it supplies from in-band signaling unit 411 (FIG. 4).

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. Apparatus in a personal digital assistant (PDA) for use in completing a single incoming call from a calling party that is waiting on-line to be connected to a called party, comprising:
   a receiver that receives a wireless actuation signal from the calling party, the wireless actuation signal indicating that a communication is waiting on-line for the called party to complete the single incoming call, the waiting communication being one of a plurality of communication types;
   an outgoing connection origination unit that, in response to the wireless actuation signal being received at the called party, establishes a return connection from the PDA to a bridge holding the waiting communication from the calling party to complete the single incoming call;
   at least one communication unit that handles signals of the type of communication that is waiting on-line;
   means for determining the type of the waiting communication from the calling party and for routing the signals received over the return connection to a corresponding one of the at least one communication unit; and
   alerting means for generating an alert when the type of the waiting communication is an incoming voice call, and, if the type of communication is an information transmission, alerting upon an information transmission of an information call having been successfully received.

2. The apparatus as defined in claim 1, further comprising:
   means for storing information transferred over said outgoing connection origination unit; and
   means for actuating said alerting means when the type of communication that is waiting is information only after said information is successfully transferred to said PDA and stored in said means for storing.

3. The apparatus as defined in claim 1, further comprising:
   means for actuating said alerting means prior to said called party being connected to said calling party when the type of communication that is waiting is voice.

4. The apparatus as defined in claim 3, further comprising:
   means for detecting a signal indicating that said call from said calling party remains in-progress and wherein said means for actuating only actuates said alerting means while said in-progress signal is received.

5. The apparatus as defined in claim 1, wherein said return connection is established over the most cost effective channel.

6. The apparatus as defined in claim 1, wherein said return connection is established over the most efficient channel.

7. The apparatus as defined in claim 1, wherein said wireless actuation signal includes an indication of the identity of said calling party and said apparatus further includes:
   means for extracting said indication of the identity of said calling party from said wireless actuation signal; and
   means for conveying said extracted identity to said called party.

8. The apparatus as defined in claim 7, wherein said means for conveying comprises means for displaying said extracted identity to said called party.

9. The apparatus as defined in claim 7, wherein said means for conveying comprises means for audibly indicating said extracted identity to said called party.

10. Apparatus in a portable communications device for use in completing a single incoming call from a calling party that is waiting on-line to be connected to a called party, comprising:

means for receiving a wireless actuation signal from the calling party, the wireless actuation signal indicating said single incoming call is waiting on-line for said called party to complete the single incoming call;

means for establishing a connection in response to said wireless actuation signal being received at the called party to a meet me unit at which said single incoming call from said calling party is waiting to complete the single incoming call;

means for determining whether said single incoming call waiting on-line is a voice call or an information call;

means for alerting;

means for receiving an information transmission over said connection to said meet me unit when said determination is that said waiting call is an information call; and means for activating said alerting means only when said connection to said meet me unit is established and said waiting call is a voice call or said information transmission is successfully received.

11. Apparatus in a portable communications device for use in completing a single incoming call from a calling party that is waiting on-line to be connected to a called party, comprising:

means for receiving a wireless actuation signal from the calling party, the wireless actuation signal indicating the waiting single incoming call is waiting on-line for the called party to complete the call;

means for placing a return call in response to the wireless actuation signal being received at the called party from the portable communications device to a meet me unit at which the waiting single incoming call from the calling party is waiting to complete the single incoming call;

means for determining whether the waiting single incoming call from the calling party is a voice call or an information call;

means responsive to the return call for generating an alert to alert the called party when the waiting call is an incoming voice call, and, if the type of communication is an information transmission, alerting upon an information transmission of an information call having been successfully received; and means responsive to the received wireless actuation signal for activating the means for placing the return call to place the return call to the meet me unit and for activating an information communication device on the return call to receive an information transmission when the waiting call is an information call.

12. The apparatus as defined in claim 11, wherein said wireless actuation signal includes an indication of the identity of said calling party and said apparatus further includes:

means for extracting said indication of the identity of said calling party from said wireless actuation signal; and means for displaying said extracted identity to said called party.

13. Apparatus in a portable communications device capable of handling multimode calls that is being used to complete a single incoming call from a calling party that is waiting on-line at a meet me unit to be connected to a called party, comprising:

means for receiving a wireless actuation signal from the calling party, the wireless actuation signal indicating a single incoming call is waiting on-line for the called party to complete the single incoming call;

means in response to the wireless actuation signal being received at the called party for placing a return call from the portable communications device to the meet me unit to complete the single incoming call;

means for determining whether the waiting single incoming call is a voice call or a facsimile call;

means for activating a facsimile communication device on the call from the portable communication device to the meet me unit to receive a facsimile transmission when the waiting call is a facsimile call; and alerting means responsive to the received wireless actuation signal for generating an alert to alert the called party when the waiting call is an incoming voice call, and, if the type of waiting call is a facsimile transmission, alerting upon the facsimile transmission of the facsimile call having been successfully received.

14. The apparatus as defined in claim 13, further comprising:

means for receiving an in-progress signal from said meet me unit when said waiting, call is a voice call;

and wherein said alerting means for alerting said called party is responsive to receipt of said-in progress signal so that, when said waiting call is a voice call, alerting is provided only while said in-progress signal is being received.

15. A method for use in a personal digital assistant for use in completing a single incoming call from a calling party that is waiting on-line to be connected to a called party, the method comprising the steps of:

receiving a wireless actuation signal from the calling party, the wireless actuation signal indicating which of a voice call or an information call is waiting on-line for said called party to complete the single incoming call;

determining, in response to the wireless actuation signal, whether a voice call or information call is waiting on-line;

establishing a connection to a meet me unit at which the single incoming call from the calling party is waiting to complete the single incoming call in response to the wireless actuation signal being received at the called party;

alerting, in response to the determining step and the establishing step, the called party when the waiting single incoming call is a voice call;

generating an alert, in response to the determining step and the establishing step, for the called party when an information transmission of an information call has been successfully received; and activating, in response to the determining step and the establishing step, an information communication device to receive an information transmission when the waiting single incoming call is an information call.

16. The method as defined in claim 15, further wherein said wireless actuation signal includes an indication of the identity of said calling party and said method further includes:

extracting said indication of the identity of said calling party from said wireless actuation signal; and conveying said extracted identity to said called party.

17. Apparatus in a portable communications device for use in completing a single incoming call from a calling party that is waiting on-line to be connected to a called party, comprising:

means for receiving a wireless actuation signal from the calling party, the wireless actuation signal indicating which of a voice call, facsimile call or a data call is waiting on-line for the called party to complete the single incoming call;

means responsive to the wireless actuation signal for making a determination as to which of a voice call, facsimile call or a data call is waiting on-line;

means for establishing a connection in response to the wireless actuation signal being received at the called party to a meet me unit at which the single incoming call from the calling party is waiting to complete the single incoming call;

alerting means for generating an alert responsive to the determination and the connection, for alerting the called party when the waiting single incoming call is a voice call and, if the waiting single incoming call is a facsimile call or a data call, alerting the called party upon a facsimile transmission of the facsimile call or a data transmission of the data call having been successfully received; and means responsive to the determination and the connection, for activating a facsimile communication capable device to receive a facsimile transmission when the waiting call is a facsimile call and for activating a data communication capable device to receive a data transmission when the waiting single incoming call is a data call.

18. The apparatus as defined in claim 17, wherein said means for establishing a connection establishes the most inexpensive connection possible.

19. A method for use in completing a single incoming call that is initiated from an on-line calling station to a called party, comprising the steps of:

receiving a single incoming call placed to a portable digital assistant of the called party from the calling station;

transmitting a signal for actuating the portable digital assistant of the called party;

receiving a connection originated from the portable digital assistant to a predetermined number in response to the signal for actuating being received at the called party to complete the single incoming call waiting on-line;

checking if said call from said calling station and the received connection employ a common protocol;

converting the call from the calling station and the received connection to a common protocol only if the result of said step of checking is negative;

connecting the common protocol representation of the call from the calling station and the received connection together; and generating an alert to alert the called party when the call is a voice call, and, if the call is an information call, alerting upon an information transmission of an information call having been successfully received.

20. The method as defined in claim 19, further including the step of:

storing information received from said call from said calling station at least until said connection originated from said portable digital assistant is received.

21. Apparatus for use in completing a single incoming call that is initiated from an on-line calling station to a called party, comprising:

means for receiving a single incoming call placed to a portable digital assistant of the called party from said on-line calling station;

means for transmitting a signal for actuating the portable digital assistant of the called party;

means for receiving a connection originated from the portable digital assistant to a predetermined number in response to the signal for actuating being received at the called party to complete the single incoming call;

means for checking if said call from the calling station and the received connection employ a common protocol;

means for converting said call from the calling station and the received connection to a common protocol only if the result of the step of checking is negative;

means for connecting the common protocol representation of the call from the calling station and the received connection together; and means for alerting the called party when the call is a voice call, and, if the call is an information call, alerting the called party upon an information transmission of the information call having been successfully received.

22. A method for use in completing an incoming call to a personal digital assistant (PDA) from a network communication system including a meet me unit, comprising the steps of:

receiving in the network communication system an incoming call placed to the PDA from an on-line calling station;

holding the incoming call on-line at the meet me unit;

making a determination in the meet me unit as to whether the incoming call is a voice call or an information call;

transmitting from the network communication system a wireless actuation signal for actuating the PDA, the wireless actuation signal including an indication of the determined type of call;

receiving the transmitted wireless actuation signal in the PDA;

making a determination in the PDA as to whether a voice call or information call is being held on-line at the meet me unit;

responsive to the determination in the PDA, actuating an alerting unit in the PDA both when the waiting call is a voice call and, if the call is an information call, alerting upon an information transmission of an information call having been successfully received;

originating a connection from the PDA to the meet me unit in response to receipt of the wireless actuation signal for actuating at a called party to complete the incoming call waiting on-line;

responsive to the determination in the PDA, activating in the PDA an information communication device in the PDA to receive an information transmission when the waiting call is an information call; and connecting the call and the connection from the PDA together in the meet me unit.

23. The method as defined in claim 22, further including the step of:

checking in said meet me unit if said call from said calling station and said connection from said PDA employ a common protocol; and in said meet me unit, converting said call from said calling station and said connection from said PDA to a common protocol only if the result of said step of checking is negative;

wherein, in said connecting step, the common protocol representation of said call and said connection from said PDA are connected together.

24. A method for use in completing one incoming call to a personal digital assistant (PDA) from a network communication system including a meet me unit, comprising the steps of:

receiving in the network communication system one incoming call placed to the PDA from a calling station waiting on-line;

holding the one incoming call waiting on-line at the meet me unit;

making a determination in the meet me unit as to whether the one incoming call is a voice call or an information call;

transmitting from the network communication system a wireless actuation signal for actuating the PDA;

receiving the transmitted wireless actuation signal in the PDA;

originating a connection from the PDA to the meet me unit in response to receipt of the wireless actuation signal for actuating at a called party to complete the one incoming call waiting on-line;

receiving over the originated connection from the PDA to the meet me unit an indication specifying whether a voice call or information call is being held at the meet me unit;

responsive to the received indication, actuating an alerting unit in the PDA both when the waiting call is a voice call and, if the incoming call is an information call, alerting upon an information transmission of an information call having been successfully received;

responsive to the received indication, activating in the PDA an information communication device in the PDA to receive an information transmission when the waiting call is an information call; and connecting the call and the originated connection together in the meet me unit.

25. The method as defined in claim 24, further including the step of:

checking in said meet me unit if said call from said calling station and said originated connection employ a common protocol; and in said meet me unit, converting said call from said calling station and said originated connection to a common protocol only if the result of said step of checking is negative;

wherein, in said connecting step, the common protocol representation of said call and said originated connection are connected together.

* * * * *